Jan. 19, 1932.  W. S. EATON  1,842,346
METHOD AND APPARATUS FOR RADIO OPERATED STEERING
Filed Dec. 3, 1930  3 Sheets-Sheet 1
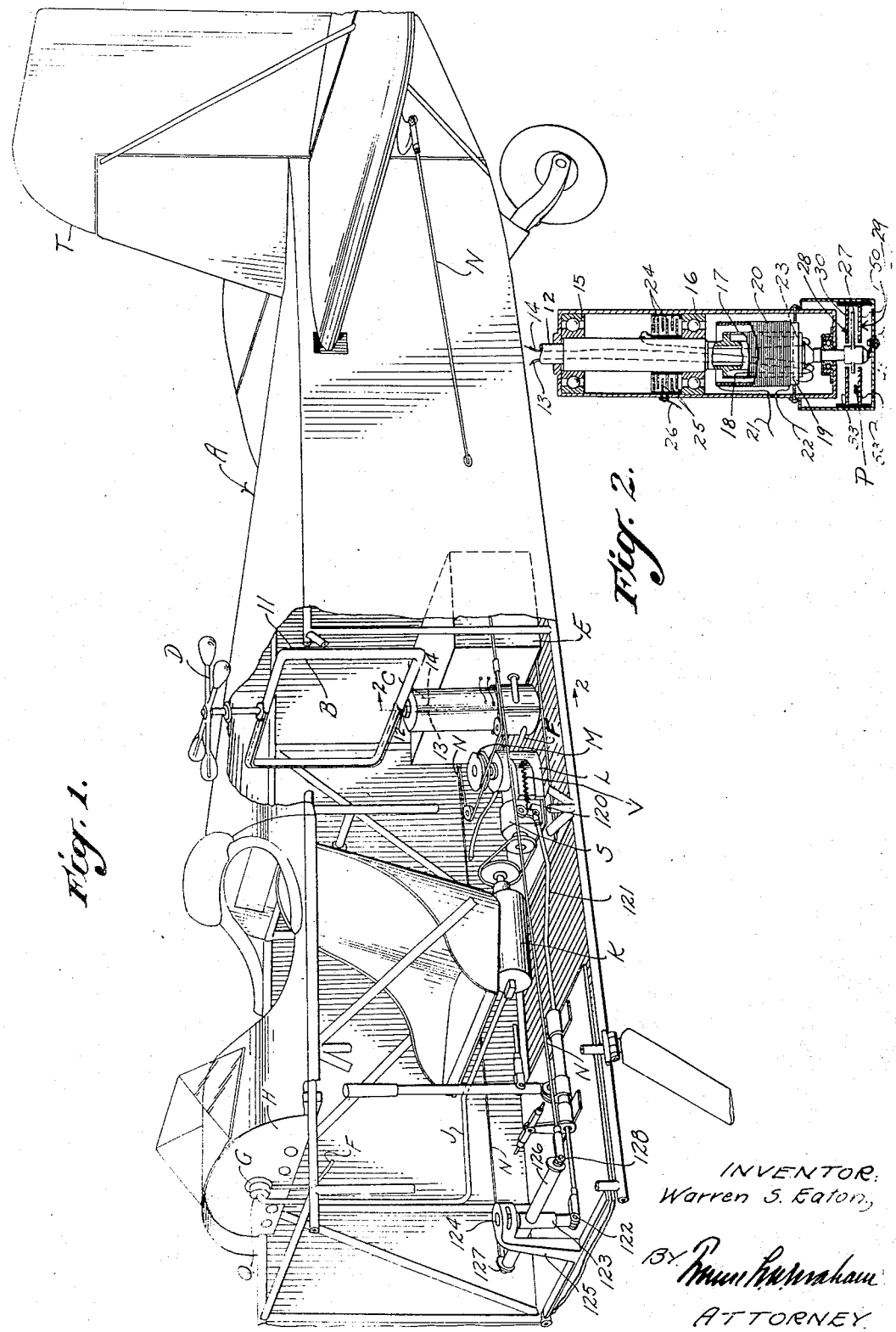
INVENTOR:
Warren S. Eaton,
BY
ATTORNEY Jan. 19, 1932.   W. S. EATON   1,842,346
METHOD AND APPARATUS FOR RADIO OPERATED STEERING
Filed Dec. 3, 1930    3 Sheets-Sheet 2
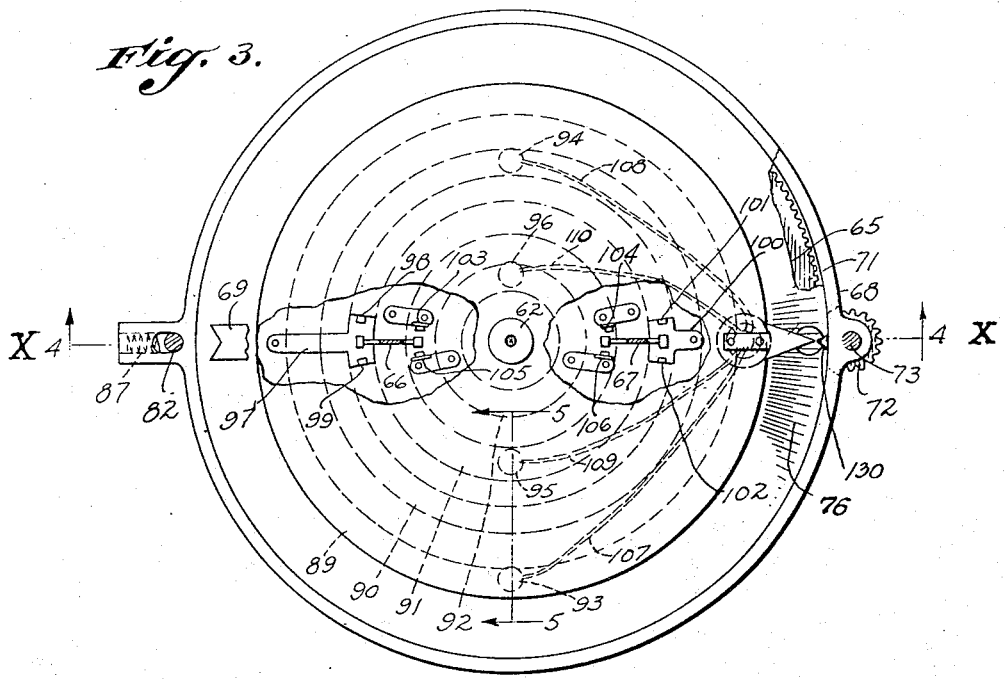
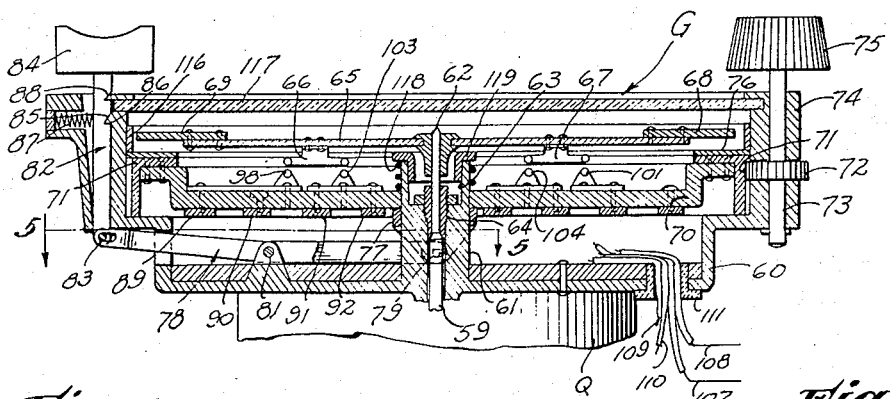
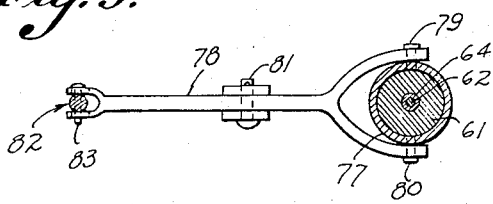
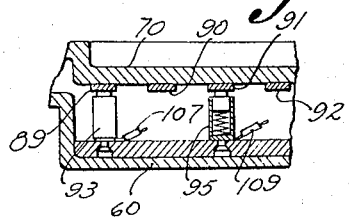
INVENTOR:
Warren S. Eaton,
BY *Bruce Kalmbach*
ATTORNEY.

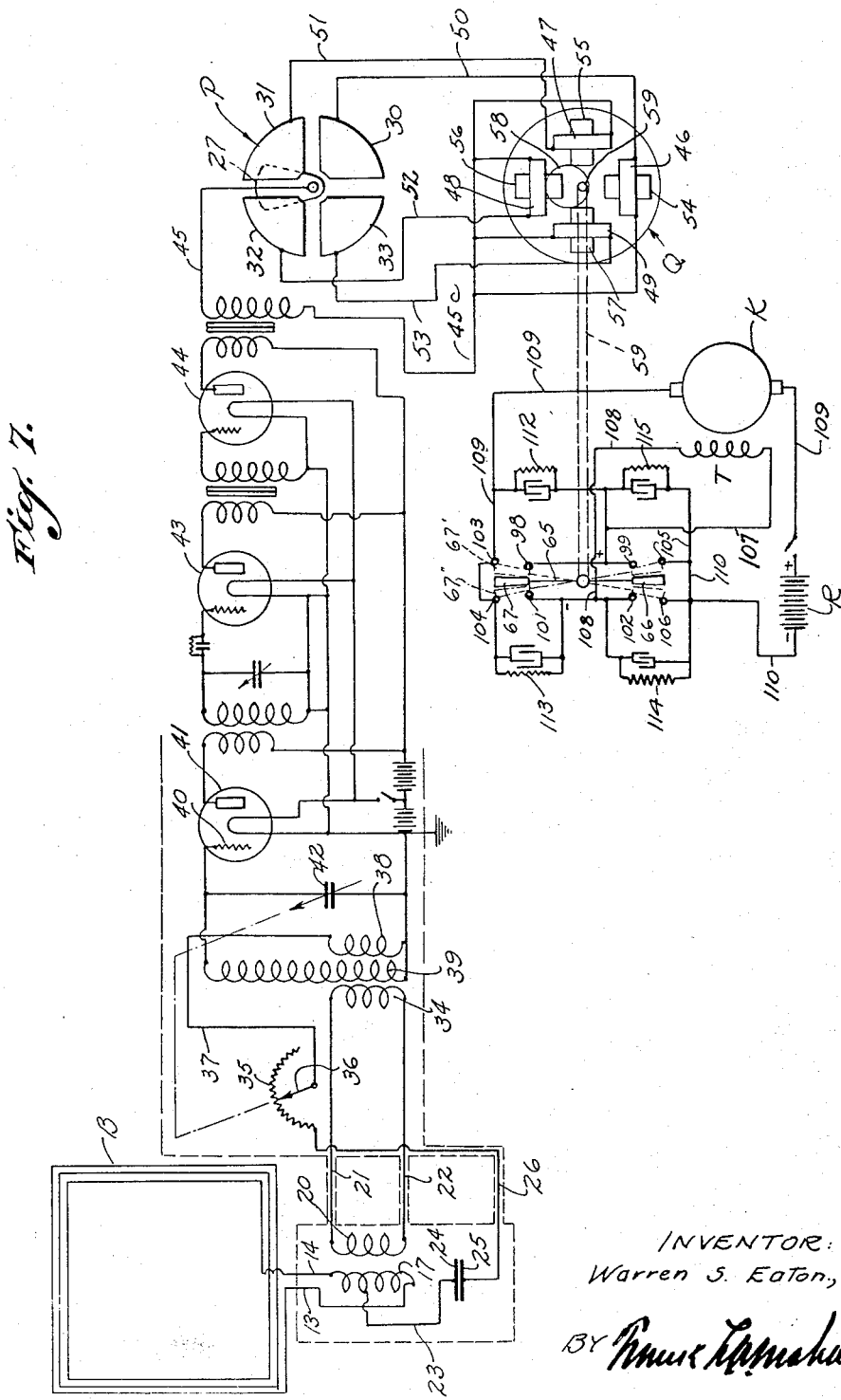

Patented Jan. 19, 1932

1,842,346

UNITED STATES PATENT OFFICE

WARREN S. EATON, OF LOS ANGELES, CALIFORNIA, ASSIGNOR TO EATON RADIO INSTRUMENT CORPORATION, A CORPORATION OF CALIFORNIA

METHOD AND APPARATUS FOR RADIO OPERATED STEERING

Application filed December 3, 1930. Serial No. 499,841.

This invention is a radio operated steering device, and has been designed primarily with reference to air navigation, but may also be equally serviceable to steer a course on land or water.

The primary object of this invention is to define a course by means of received electromagnetic energy, and to actually steer a vehicle upon the defined course.

The present invention is closely related to previous inventions of mine which are embodied in my copending applications, Serial No. 355,015, filed April 15, 1929, Serial No. 348,031, filed March 18, 1929, Serial No. 432,740, filed March 3, 1930, and more specifically to a companion application, Serial No. 499,735, filed December 3, 1930.

In each of the above mentioned applications, the received direction of received electro-magnetic energy is established by the use of instrumentalities fully disclosed and described therein.

According to the present embodiment of the invention, there is generated by received electro-magnetic energies fields of force the effects of which bear a predetermined angular relation to the received direction of the received energy, and these fields are employed to automatically steer the vehicle and hold said vehicle upon a defined course.

The various elements shown in the before mentioned applications may be utilized for carrying out the objects of the present invention. In the present embodiment of my invention I use that form of a device disclosed in my companion application, Serial No. 499,735, filed December 3, 1930, wherein I have disclosed a rapidly revolving loop antenna which is capacitively and inductively connected to an indicator.

In the present embodyment of my invention the device has been shown in connection with an airplane, and the loop has been designed to rotate by means of anemometer cups when the airplane travels through the air. The incoming energy is impressed upon the rotating loop.

It is common knowledge that there are two component energies received on a loop antenna. One is due to the space disposition of the wires in the vertical members of the loop and hereinafter will be referred to as the loop signal. The other component is due to the open antenna effect of the loop as a whole which possesses capacity with respect to the grounded members, and hereinafter will be referred to as the vertical component.

By means of phasing the loop signal with the vertical component of the signal resulting from the loop acting as an open aerial, the input energy is reduced to a pattern having a signal maximum, and is amplified by suitable means. The amplified energy is then conducted to an output commutator, which is connected to the elements of an indicating device which is provided with a rotor that operates an indicating needle, which indicates the direction of the incoming wave.

It is obvious that conditions may arise when the automatic steering control is not capable of meeting sudden emergencies, such as taking off and landing. For this reason, I have provided for disconnecting the automatic control device from the rudder so that the pilot may manually control the ship.

In the art of navigation, it is well known that a vehicle is apt to get off its course by drifting with the currents or from other well known causes. My invention recognizes this fact and provides for compensating for drifting while automatically steering a vehicle upon a defined course.

Further objects of this invention are:

To provide for receiving electro-magnetic energy and resolving said energy into a field of force, which automatically operates to define a course for a vehicle, and to automatically steer the vehicle upon said course;

Other objects and advantages will become apparent as the description proceeds in conjunction with the drawings in which—

Fig. 1 is a perspective of an airplane fuselage partly broken away, showing the installation of the parts of my device as they would appear in actual operation;

Fig. 2 is a vertical section taken on the line 2—2 of Fig. 1;

Fig. 3 is a plan view, partly broken away, of the device which operates to control steering of the vehicle;

Fig. 4 is a vertical section on line 4—4 of Fig. 3;

Fig. 5 is a plan view on line 5—5 of Fig. 4;

Fig. 6 is a fragmentary sectional view on line 5—5 of Fig. 3; and

Fig. 7 is a schematic view showing the wiring diagram and the electrical elements employed in my invention.

Referring to the drawings which are used for illustrative purposes only, and particularly to Fig. 1, I have shown a fragment of an airplane fuselage, and have designated it A. In the fuselage A, I have installed my invention, which is shown as including a rotating loop B mounted upon a casing C, said casing being substantially identical with that described in my companion application, Serial No. 499,735, filed December 3, 1930; and to be fully described hereinafter.

The loop B is rotated by means of anomometer cups D arranged outside the fuselage. A receiver set E is connected to the casing C and operates to produce from the received electro-magnetic energy an output pattern.

From the casing C the current is conducted by means of a cable F to a direction indicating device Q, mounted upon the instrument board H of the airplane.

From the device G, which is a part of this invention, the current is conducted by means of a cable J to a motor K, which latter, by means of a gear reduction unit L, drives a drum M, which operates the rudder T through the cable N.

Taking up the units in substantially the order named: The loop B comprises a frame member 11 mounted upon a shaft 12, which shaft is adapted to rotate within the casing C. The frame member 11 is formed of hollow members, which may be suitably stream-lined to yield minimum resistance upon rotation, and a loop antenna is placed therein with the ends of the loop shown at 13 and 14 extending downwardly through the hollow shaft 12 as shown in Figs. 1 and 2.

The casing C is arranged to rotatively receive the shaft 12, and for this purpose is provided with bearings 15 and 16 as shown in Fig. 2.

On the lower end of the shaft 12 I have mounted a coil 17, and have connected the conductors 13 and 14 to opposite ends of the coil, as shown at 18 and 19. Surrounding the coil 17, and preferably concentric therewith, I have mounted a second coil 20, which is a fixed coil, and have connected conductors 21 and 22 to opposite ends thereof to connect the coil 20 to the receiving set E. This arrangement will be recognized as a means of inductively transferring the energy from the rotating loop to the set without introducing frictional or sliding contacts.

In order to obtain a cardioid output pattern, which obviates any error of 180°, I combine the vertical component of the incoming signal with the loop signal. For this purpose, I connect the midsection of the coil 17 with a conductor 23, said conductor leading upwardly through the hollow shaft 12, to plates 24 that are arranged to rotate with the shaft and between fixed plates 25. The energy is thus transferred capacitively to conductor 26 that leads to the receiving set E.

The casing C also contains an output commutator, generally designated P, mounted in the lower end thereof. The commutator P is for the purpose of transmitting the output energy from the receiving set to an indicator, and consists of a rotor plate 27 adapted to rotate with the shaft 12, and being secured on said shaft in predetermined relation to the maximum or the minimum receiving position of the loop B, preferably the maximum receiving position. Though this is not essential as the needle of the indicating device Q may be so positioned in relation to the rotor of same, that true direction is indicated.

The rotor plate 27 is arranged to rotate between parallel plates 28 and 29, which are divided into quadrants 30, 31, 32, and 33, best shown in Fig. 7.

By referring to Fig. 7, a more comprehensive understanding of the operation is had. As indicated in this view, the incoming energy is received upon the loop B, and, by means of conductors 13 and 14, is passed through the coil 17 where it is inductively transferred to coil 20, which, by means of shielded leads 21 and 22, conducts the current through the coil 34. The vertical component, as before stated, is taken from the midsection of coil 17, and, by means of a conductor 23, is capacitatively connected to conductor 26 through spaced plates 24 and 25. The conductor 26 leads to a phasing resistance 35. The movable contact finger 36 picks up the current from the resistance 35, and by means of a conductor 37 passes the current through a coil 38. In inductive and capacitive relation with the coils 34 and 38 is a coil 39, which is connected to the grid member 40 of a vacuum tube 41. A variable condenser 42 is mounted across the coil 39, and may be coupled with the contact finger 36 for uniremote controlling.

It is to be understood that the phasing resistance 35 is for the purpose of phasing the vertical component with respect to the loop signal, to enable combining said vertical component and said loop signal by means of the coils 34, 38, and 39, to produce an input energy having a cardioid pattern. After the energy has been detected by the tube 43, it may be amplified in any suitable manner, such as by tube 44. The amplified energy is then conducted to the commutator P through a conductor 45 leading from the output of the receiver to the rotor 27.

The commutator P is connected by the conductors 50, 51, 52 and 53 to a device designated Q, which rotates a shaft 59, and orients said shaft with respect to the received direction of the received electro-magnetic energy. The device Q, for this purpose, is provided with coils 46, 47, 48, and 49. The quadrants 30, 31, 32, and 33 are connected to coils 46, 47, 48, and 49, respectively, by conductors 50, 51, 52, and 53, respectively. The opposite ends of the coils are connected to a common conductor 45ᶜ leading from the output of the receiver. The coils 46, 47, 48, and 49 are arranged about cores of magnetic material 54, 55, 56, and 57, respectively, which, upon being energized by the commutator P, exert a magnetic influence upon a rotor 58 that rotates the shaft 59 as disclosed in my application Serial No. 355,015.

It is to be understood that the rotor 58 will rotate into predetermined relation with the direction of the incoming signal and will maintain this relation under the influence of the fields of force set up in the electro-magnets 54, 55, 56 and 57 of the device Q.

My invention provides for utilizing the rotation of the shaft 59 to steer a vehicle. In Figs. 1 to 6, inclusive, I have disclosed a means for this purpose.

Referring to Fig. 4, I have illustrated the device G as superposed over the instrument Q, with the shaft 59 of the instrument Q running through and into the working parts of G. As shown, the device G comprises a casing 60 mounted upon the instrument Q. The casing 60 is provided with a central hub 61, into which the shaft 59 rotatably extends.

Joined to the shaft 59, in any suitable manner, is a smaller shaft 62, or, if preferable, the shaft 62 may be integral with the shaft 59, and of smaller diameter, as shown. The upper end of the hub 61 is provided with a chamber 63. A bearing 64, for the shaft 62, is mounted in hub 61. The upper end of the shaft 62 carries a plate 65, which is of suitable insulating material and is arranged to rotate with the shaft 62. The plate 65, in turn, carries double contact members 66 and 67 mounted on the under side thereof. Also mounted on the plate 65, I include an arrowhead, shown at 68, and an arrow-tail, shown at 69. Loosely mounted upon the hub 61, I provide an insulation disk 70, which is equipped on the periphery with gear teeth 71 (best shown in Fig. 3). The gear teeth 71 are arranged to mesh with a gear 72, carried upon a shaft 73, said shaft being mounted in a boss 74 on the casing 60, and having a knob 75 for manually turning the shaft. This arrangement is for the purpose of orienting the disk 70. The disk 70 is equipped around the outer margin with a degree scale 76, which is arranged to cooperate with the needle 68 to indicate direction.

As before stated, the disk 70 is loosely mounted upon the hub 61, and is slidably supported thereon by means of a sleeve 77, which sleeve is adapted to be reciprocally moved on the hub 61 by means of a Y-shaped member, generally designated 78. The Y-shaped member is attached to the sleeve 77, as shown at the two pivot points 79 and 80, and is fulcrumed, as shown at 81, upon the casing 60. The outer end of the yoke is pivotally connected to a push pin, generally designated 82, as shown at 83. The push pin 82 is provided on the upper end with a push button 84, and is held against upward motion by means of a notch 85, which engages a lug 86 on the casing 60. A compression spring 87 is provided for the purpose of holding the device in an operative position, to be more fully explained hereinafter.

The under side of the disk 70 is equipped with concentric rings 89, 90, 91, and 92. As a means of contacting said rings, respectively, I provide spring impelled brushes, shown at 93, 94, 95, and 96. On the upper side of the disk 70, I provide a series of upstanding contact fingers, said fingers being connected in the following manner to the concentric rings: Connected to ring 89 is a contact member 97 having a pair of upstanding contacts 98 and 99; connected to ring 90 is a contact member 100 having upstanding contact points 101 and 102; connected to the ring 91 are upstanding contact members 103 and 104; and connected to the ring 92 are upstanding contact members 105 and 106.

The ring 89, connecting contact points 98 and 99, is connected to one end of a motor field winding T shown in Fig. 7 by means of the brush 93 and a conductor 107; shown in Figs. 3 and 7; the ring 90, connecting contact points 101 and 102, is connected to the opposite end of the motor field winding T shown in Fig. 7 by means of the brush 94 and a conductor 108 shown in Figs. 3 and 7; the ring 91, which connects the contact points 103 and 104, is connected to a conductor 109 by means of the brush 95; and the ring 92, which connects the contact points 105 and 106, is connected to a conductor 110, by means of the brush 96.

As shown in Fig. 4 the conductors 107, 108, 109, and 110 are all brought out of the casing 60 through an outlet bushing 111.

Reference will now be had to Fig. 7 for a completion of the description of the wiring diagram.

In the schematic diagram of the device G, the same reference numerals as used in Figs. 3 to 6 have been used to designate like parts in Fig. 7. As shown in Fig. 7, the double contacting members 66 and 67 are arranged to pass a current from the battery R in opposite directions, through the field winding T of the motor K, depending upon the direction in which the plate 65, which carries the contactors 66 and 67, is swung. In order to prevent undue sparking, spark suppressors, shown at 112, 113, 114, and 115, are connected across the contact points 98—103, 101—104, 102—106, and 99—105, respectively.

In steering an airplane by means of my automatic steering device, the action is as follows: The receiving set E is tuned to receive the electro-magnetic energy from the station which is selected as the destination of the ship. The said energy is received and combined to produce a pulsating electromotive force having a single maximum. It is then commutated by the commutator P. From P it passes to the indicating device Q, which operates to turn the rotor 58 into predetermined relation with the direction of the incoming energy. The shaft 59 operates the plates 65 which carries the double contact points 66 and 67.

The instrument G is brought into operation in the following manner: The plate 65, by rotating with the shaft 59, swings the head of the needle 68 until it points in the direction of the station broad-casting the electro-magnetic energy. This will indicate the general direction to be followed. The ship, however, may not be upon a direct course between the point of departure and the point of destination. It may be navigated to such a course by maneuvering until a reading taken on the station at the point of departure is 180° from a reading taken on the station at the destination point. The ship is then at a point upon the true course between the two points, but is not necessarily oriented with respect to the direction of travel. In order to properly orient the ship upon its true course it is necessary to bring the longitudinal axis of the ship indicated by X—X in Fig. 3 into alignment with the direction indicated by the needle 68. This is done by maneuvering the ship until the needle 68 registers with a fixed pointer 130 either on the glass 117 or the casing 60. After the needle has been brought to rest on the pointer 130, the disk 70 is rotated by means of the thumb nut 75 and the gears 71 and 72 until the zero point on the dial 76 comes under the point of the needle. This serves to locate the contact points 98, 99, 103, and 105, under the double contact member 66, and the contact points 101, 102, 104, and 106, under the double contact member 67. The disk 70 is then raised into a position until the contacts are in engaging position, and contact may be made between the double contact members 66 and 67 and the upstanding contacts on the disk 70, by rotation of plate 65.

The means for raising the disk, as shown and described, comprises the yoke member 78 and the push button 84. By pushing down upon the button 84 and the push pin 82, the notch 85 disengages the lug 86, and the pin 82 is depressed until notch 88 engages said lug. This action raises the sleeve 77 on the hub 61, which raises the disk 70 until a spacer ring 116 engages the under side of a cover glass 117.

The disk 70 is frictionally held against rotation by this ring, and is also held in tight engagement with the sleeve 77 by means of a spring 118 interposed below a flange member 119, screw-threadedly mounted in the chamber 63 of the hub 61.

The foregoing operations will be recognized as bringing the fixed contact points into engaging position with the swinging double contact members 66 and 67. So long as the ship remains upon its true course, i. e., the course to the broadcasting station selected, the needle point 68 will not move, but if the ship veers off the course for any reason, the needle point will remain in the direction of the broadcasting station, and the double contact elements 66 and 67 will assume a relative position such as shown in dotted lines designated 67', in Fig. 7. This will be observed to form a circuit from the battery R through the motor K, and will be further observed to conduct the positive side of the battery R through the conductors 109 and 107 to field winding T which rotates the motor in a direction to turn the rudder in a manner to bring the ship back upon the course. If the vehicle swings in the opposite direction, the double contact points will assume the position shown in dotted lines, and indicated at 67″. This will be observed to connect the positive side of the battery through the conductors 109 and 108 to the field winding T, and will rotate the motor in an opposite direction.

It is obvious that with the automatic reversing switch operable by the relative swinging of the needle, interposed between the battery R and the motor K, that the force operable to turn the rudder in either direction desired is available.

While I have for convenience shown the contacts in diagrammatic sketch G as being directly in the battery and motor circuit, it is understood that these contacts would preferably control the operation of relays or any other suitable apparatus and the latter in turn control the operation of the motor.

The means for controlling the rudder, as before stated, comprises the motor K with a gear reduction L and a drum M, around which the rudder cable N is wound. However, since it is a part of this invention to include means whereby the automatic control of the ship is taken over by manual control, such means are shown as comprising a clutch, generally designated S, interposed between the motor K and the gear reduction L. The clutch S is provided with a lever arm 120, to which is pivotally connected a pull bar 121. The lever arm 120 normally holds the clutch in the engaged position, due to the action of the spring V. The pull bar extends forwardly, and is pivotally attached, as shown at 122, to the lower end of a member 123, which member, in turn, is universally mounted, as shown at 124, in a bracket 125. A foot bar 126 passes through the member 123 below the pivot point 124, and is attached at its outer ends to the ruder cable N, as shown at 127 and 128. It is obvious that as the pilot places his feet upon the foot bar 126, and presses forward to feel the rudder, that the member 123 will swing slightly forward on its pivot 124, and will disengage the clutch S by means of the pull bar 121 and the lever 120. This will serve to disengage the automatic control mechanism, and place the ship under manual control.

As before stated, this invention takes into consideration the problem of drifting as it affects air and water navigation. In flying from one destination to another, the direct course usually passes over or near emergency landing fields that have been placed as nearly as possible on a direct route between the two stations. Consequently, it behooves a pilot to follow as closely as possible a direct course between destinations if he is to avail himself of such emergency landing fields. Under certain favorable weather conditions the drift angle may be calculated from weather reports before the plane leaves the ground. Under other conditions this cannot be done since the wind may vary over different localities and a new drift angle must be calculated while the plane is in flight in order to compensate for this change. There are various methods of calculating the drift angle, any one of which is suitable. However, in view of the characteristics of the device embodied in this invention, which permits that it may be used as a direction indicator, I determine the drift angle while the plane is in flight as follows: After the plane is in the air and has traveled from the field of departure on the course indicated by the needle 68, I take an observation by means of the direction indicator Q on the station at the field of departure. I then take another observation on the station at the field of destination. If the plane is on a direct course between the two stations, the readings should be 180° apart. If the plane is not on a direct route, the reading between the two stations will be less than 180°. The ship may then be brought back onto the direct course between the two stations in a manner hereinbefore described. If two consecutive readings are taken with a short time interval between and the 180° condition prevails, the angle between the position of the needle and the ship's axis indicated by the pointer 130 is the drift angle. The observed drift angle is then set off on the steering device by rotating the dial 76 by means of the thumb nut 75 until the zero point on dial 76 is directly under the point of the needle. Depressing push button 84 then raises the contact carrying plate 70 to the engaging position of the contacts. After this operation the device will operate to steer the plane upon a direct route between the two stations and automatically compensate for drifting. In case the wind velocity varies or the direction of the wind changes, I may take readings from time to time and may correct the drift angle according to the new observations.

The hereinbefore described instrumentalities and elements will be recognized in their coordinated actions and functional relations, as providing means for automatically defining a course, and for automatically steering a ship upon said course, together with means for quickly and automatically taking over the control of the ship for manual operation.

While I have described in the specification and shown in the drawings the means of my copending application, Serial No. 499,735, for the rotational reception and transfer of electric-magnetic energy, it will be understood that my invention is not limited to rotational reception, but may utilize any system of fixed antennæ, such for instance as disclosed in my copending applications, Serial Nos. 348,031, 355,015 and 432,740.

From the foregoing description, it will now be understood that my invention is a remote control system, in that the energy is received from a remote source or sources and is then utilized to effect direction indication on the vehicle, and then by this direction indication to automatically control steering of the vehicle. Accordingly, by effecting directional indications by energies received from a plurality of sources and then mutually varying the power of the energies, the steering of the vehicle may be changed from one course to another at will, thus enabling the automatic steering of the vehicle in all directions by remote control without requiring the presence of a pilot or steersman on the vehicle.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is headed along the line of direction indicated by the indicator needle of the instrument.

Although I have shown and described a specific embodiment of my invention, and have directed the description toward the details of said embodiment, nevertheless, I intend this disclosure to include all means with-

I claim:

1. A radio operated steering mechanism having means for selectively receiving electro-magnetic energy, means for utilizing said received energy for direction indication, and means controlled by said direction indication to operate the steering mechanism.

2. A radio operated steering mechanism having means for selectively receiving electro-magnetic energies, means for combining said received energies, means for utilizing said combined energy for direction indication, and means controlled by said direction indication to operate the steering mechanism.

3. A radio operated steering mechanism having means for rotatably and selectively receiving electro-magnetic energies, means for combining said rotatably received energies, means for utilizing said combined energies for direction indication, and means controlled by said direction indication to operate the steering mechanism.

4. A radio operated steering mechanism having means for receiving electro-magnetic energy, means for utilizing said received energy for direction indication, means controlled by said direction indication to operate the steering mechanism, and means to compensate for drifting.

5. A radio operated steering mechanism having means for receiving electro-magnetic energy, means for utilizing said received energy for direction indication, and means controlled by said direction indication to operate the steering mechanism, said direction indicating means being operable to determine the position on or relative to a course.

6. A radio operated steering mechanism having means for receiving electro-magnetic energy, means for utilizing said received energy for direction indication, said direction indicating means being operable to determine the position on or relative to a course, means controlled by said direction indicating means to operate the steering mechanism, and means to compensate for drifting.

7. A radio operated steering mechanism having means for receiving electro-magnetic energy, means for generating by said received energy the effect of a field of force bearing predetermined angular relation to the direction of the received energy, and means actuated by said field effect to operate the steering mechanism.

8. A radio operated steering mechanism having means for receiving electro-magnetic energy, means for generating by said received energy fields of force the effects of which are a single field of force bearing predetermined angular relation to the direction of the received energy, and means controlled by said fields to operate the steering mechanism.

9. A radio operated steering mechanism having means for receiving electro-magnetic energy, means for generating by said received energy fields of force the effects of which bear predetermined angular relation to the direction of the received energy, and means controlled by said fields to operate the steering mechanism.

10. A radio operated steering mechanism having means for receiving electro-magnetic energy, means for generating by said received energy fields of force the effects of which bear predetermined angular relation to the direction of the received energy, means to compensate for drifting, and means controlled by said last two mentioned means to operate the steering mechanism.

11. A radio operated steering mechanism having means for receiving electro-magnetic energy, means for generating by said received energy fields of force the effects of which bear predetermined angular relation to the direction of the received energy, means controlled by said fields to operate the steering mechanism, and means for adjusting said last mentioned means to compensate for drifting.

12. A radio operated steering mechanism having means for receiving electro-magnetic energy, means for generating by said received energy fields of force the effects of which bear predetermined angular relation to the direction of the received energy, means actuated by said fields to determine the position on or relative to a course, and means controlled by said fields to operate the steering mechanism.

13. A radio operated steering mechanism having means for receiving electro-magnetic energy, means for generating by said received energy fields of force the effects of which bear predetermined angular relation to the direction of the received energy, means actuated by said fields to determine the position on or relative to a course, means controlled by said fields to operate the steering mechanism, and means to compensate for drifting.

14. The combination with steering mechanism, of means for rotatably receiving electro-magnetic energy, and a direction indicator actuated by the received energy and operatively connected to the steering mechanism.

15. The combination with steering mechanism, of means for selectively receiving electro-magnetic energy, and a direction indicator actuated by fields of force generated by the received energy the effects of which bear predetermined angular relation to the direction of the received energy, and means operatively connecting said direction indicator with the steering mechanism.

16. A radio operated steering mechanism having means for selectively receiving electro-magnetic energy, means for utilizing said received energy for direction indication, means controlled by said direction indication to operate the steering mechanism, and means for disengaging said steering mechanism.

17. A radio operated steering mechanism having means for receiving electro-magnetic energy, means for utilizing said received energy for direction indication, said direction indicating means being operable to determine the position on or relative to a course, means controlled by said direction indicating means to operate the steering mechanism, means for disengaging said steering mechanism, and means to compensate for drifting.

18. A radio operated steering mechanism having means for receiving electro-magnetic energy, means for generating by said received energy the effect of a field of force bearing predetermined angular relation to the direction of the received energy, means actuated by said field effect to operate the steering mechanism, and means for disengaging said steering mechanism.

19. A radio operated steering mechanism having means for receiving electro-magnetic energy, means for generating by said received energy fields of force the effects of which bear predetermined angular relation to the direction of the received energy, means actuated by said fields to determine the position on or relative to a course, means controlled by said fields to operate the steering mechanism, means to disengage said steering mechanism, and means to compensate for drifting.

20. In combination with an airplane having a rudder and means for receiving electro-magnetic energy, means for creating by said received energy an electro-magnetic field of force having a single maximum in a predetermined angular relation to the direction of the said received energy, means operable by said field of force to automatically steer said airplane in the direction of the received energy, said means including a movable member controlled by said field of force, a motor operably connected to control the rudder of said airplane, and means operable by said movable member to reverse said motor upon alternate opposite movement of said movable member.

21. The herein described method of automatically controlling steering mechanism, which comprises receiving electro-magnetic energy, generating by the received energy the effect of a field of force bearing predetermined relation to the direction of the received energy, and utilizing the effect of said field for steering purposes.

22. The herein described method of automaticaly controlling steering mechanism, which comprises receiving electro-magnetic energy, generating by the received energy fields of force having the effect of a field of force bearing predetermined relation to the direction of the received energy, and utilizing the effect of said field for steering purposes.

23. The herein described method of automatically steering vehicles, which comprises selectively receiving electro-magnetic energy from a source, establishing by said received energy the direction from the point of reception to the source of the received energy, and utilizing the establishment of the said direction for automatically steering the vehicle.

24. The herein described method of automatically steering vehicles toward a destination, which comprises selectively receiving electro-magnetic energy from a source located at said destination, establishing by said received energy the direction from the point of reception to the source of the received energy, and utilizing the establishment of the said direction for automatically steering the vehicle to the destination.

25. The herein described method of automatically steering vehicles from a point of departure to a destination, which comprises establishing the drift angle of the vehicle with respect to the direction between the point of departure and the said destination, and utilizing the establishment of said drift angle to automatically steer the vehicle to the destination.

26. The herein described method of automatically steering vehicles from a point of departure to a destination, which comprises receiving electro-magnetic energy from a source located at said destination, establishing by said received energy the direction from the point of reception to the source of the received energy, establishing the drift angle of the vehicle with respect to the direction between the point of departure and the said destination, and utilizing the establishment of said drift angle to automatically steer the vehicle to the destination.

27. The herein described method of automatically steering a vehicle on a course from a point of departure to a point of destination while compensating for drifting, which comprises establishing by energy received from sources of energy at the points of departure and destination a coincidental line of direction between said points, manually steering the vehicle with respect to said line to compensate for drifting, then noting the drift angle defined by the said line of direction and the direction of the longitudinal axis of the vehicle necesary to compensate for drifting, and then utilizing the establishment of the direction to the point of destination to automatically steer the vehicle.

28. The herein described method of automatically steering a vehicle on a course from a point of departure to a point of destination while compensating for drifting, which comprises establishing the direction to said destination by energy received on the vehicle and from a source located at the point of destination, manually steering the vehicle with respect to said direction to compensate for drifting, then establishing by energy received from sources of energy at the points of departure and destination a coincidental line of direction between said points, then noting the drift angle defined by the said line of direction and the direction of the longitudinal axis of the vehicle necessary to compensate for drifting, and then utilizing the establishment of the direction to the point of destination to automatically steer the vehicle.

29. The herein described method of automatically steering vehicles on a course from a point of departure to a point of destination, which comprises establishing by energy received from a source of energy at the point of destination the direction to said destination, utilizing the establishment of said direction to automatically steer the vehicle to the destination, and determining the position of the vehicle on or relative to the course by establishing by energy received from sources of energy at the points of departure and destination the directions from the vehicle to the respective points.

30. The herein described method of automatically steering vehicles with respect to a plurality of sources of energy, which comprises receiving on the vehicle energies from said sources, establishing by said received energies a line of direction, and utilizing the establishment of said line of direction for automatically steering the vehicle.

31. The herein described method of remote control of a vehicle by a plurality of sources of electro-magnetic energy, which comprises receiving on the vehicle energies from the sources thereof, establishing on the vehicle by the received energies a line of direction, utilizing the establishment of said line of direction to automatically steer the vehicle with respect thereto, and mutually varying the power of the energies to change the established line of direction and thereby change the course of the vehicle.

32. The combination with a plurality of sources of electro-magnetic energy and a vehicle having steering mechanism, of means on the vehicle for selectively receiving energy from said sources, and means actuated by said received energy for establishing a direction with respect to said sources of energy and for controlling the steering mechanism by and with respect to said established direction.

33. An indicator switch unit for use in combination with a radio operated steering mechanism embodying, a radio operated direction indicator and a switch controlled by said indicator.

34. An indicator switch unit for use in combination with a radio operated steering mechanism embodying, a radio operated direction indicator having a movable member actuated by the elements in said indicator and a switch controlled by the movement of said movable member.

35. An indicator switch unit for use in combination with a radio operated steering mechanism embodying, a radio operated direction indicator having an indicator member, a switch member, said members having mutually engageable contacts, and means for effecting relative movement between said members for selectively engaging the contacts thereof.

36. An indicator switch unit for use in combination with a radio operated steering mechanism embodying, a radio operated direction indicator having an indicator member, a switch member, said members having mutually engageable contacts, means for rotating said switch member for bringing its contacts selectively into alignment with the contacts of said indicator member, and means for effecting relative movement between the indicator member and the switch member to bring the contacts thereof into cooperative relation whereby relative movement of the indicator member will selectively engage the contacts.

In testimony whereof, I have hereunto set my hand at Los Angeles, California, this 28th day of November, 1930.

WARREN S. EATON.

CERTIFICATE OF CORRECTION.

Patent No. 1,842,346.             Granted January 19, 1932, to

WARREN S. EATON.

It is hereby certified that error appears in the printed specification of the above numbered patent requiring correction as follows: Page 1, line 62, for "signal" read single; page 3, line 20, for "signal" read energy; and that the said Letters Patent should be read with these corrections therein that the same may conform to the record of the case in the Patent Office.

Signed and sealed this 12th day of April, A. D. 1932.

(Seal)

M. J. Moore,
Acting Commissioner of Patents.